Dec. 28, 1926.

H. L. TURNEY 1,612,238

LOGGING ENGINE

Filed April 29, 1921    2 Sheets-Sheet 2

Inventor
Harry L. Turney

By R. L. [?]
Attorney

Patented Dec. 28, 1926.

1,612,238

UNITED STATES PATENT OFFICE.

HARRY L. TURNEY, OF PORTLAND, OREGON.

LOGGING ENGINE.

Application filed April 29, 1921. Serial No. 465,452.

Logging engines are subjected to very severe strains and it is desirable to operate the main drum as rapidly as the size of the log and the conditions warrant. In order to accomplish this the main drum should be driven with different gear ratios so that it may be driven faster or slower and with greater or less power and it is desirable that it be so constructed that the shift from one gear ratio to the other may be accomplished while the machine is in operation so that with the same log where difficult going is encountered a lower gear ratio may be used and where the going is better a higher gear ratio may be used. With the present invention a simple and rugged mechanism is provided by means of which these ratios can be changed.

The invention is illustrated in the accompanying drawings as follows:—

Figure 1:
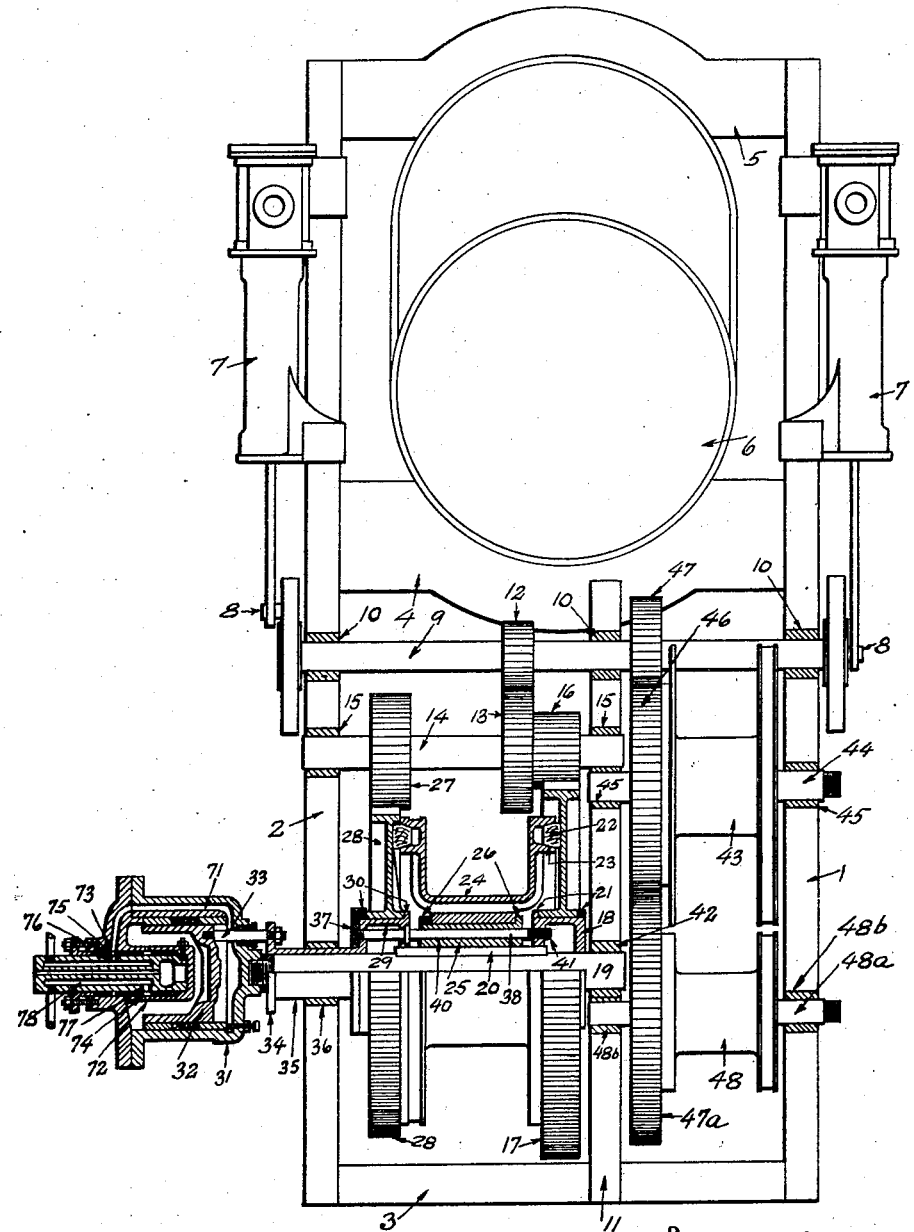

Fig. 1 shows a plan view of a logging engine, partly in section.

Figure 2:
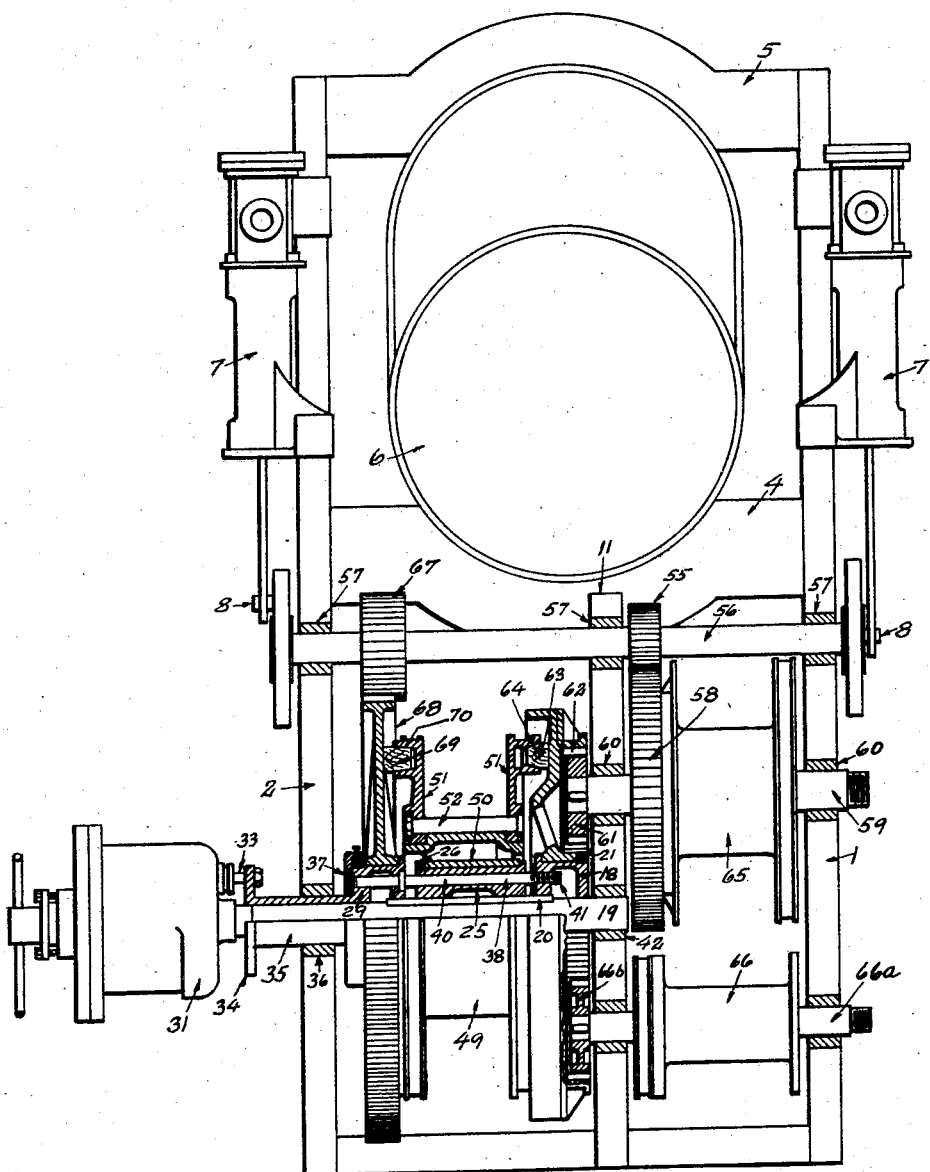

Fig. 2 a similar view of an alternative construction.

The frame is made up of the side beams 1 and 2, and cross beams 3, 4 and 5. The usual boiler 6 is mounted between the beams 4 and 5. Engines 7 are secured to the side beams operating upon the cranks 8 of the crank shaft 9. The crank shaft 9 is journaled in the bearings 10—10—10 in the side beams 1 and 2 and a middle beam 11 extending from the end beam 3 to the beam 4. A gear 12 meshes with a gear 13 on an intermediate drive shaft 14. The intermediate drive shaft 14 is journaled in bearings 15 in the beams 11 and 2. A gear 16 of the low gear connection is fixed on the shaft 14 and meshes with a gear 17. The gear 17 is journaled on a bushing 18 mounted on the main drum shaft 19. The bushing is slidingly mounted on the main drum shaft 19 but locked against rotation by a key or feather 20. Shoulders 21 lock the gear 17 against longitudinal motion on the bushing 18 but do not prevent rotation of the gear on the bushing. A friction cone 22 is mounted on the gear and operates in connection with the friction surfaces 23 on the main drum 24.

The main drum 24 is mounted on a sleeve 25, the sleeve being pressed on the shaft 19 and fixed thereon by the key 20 preventing rotation and sliding movement. Shoulders 26 are arranged at the ends of the sleeve and lock the drum in place thereon but permit the drum to rotate on the sleeve.

A gear 27 of the high-speed connection is fixed on the intermediate shaft 14 and meshes with a gear 28. The gear 28 is journaled on a bushing 29 slidingly mounted on the shaft 19. This bushing is locked against rotation by the key or feather 20. This bushing is provided with the shoulders 30 which prevent axial movement of the gear on the bushing.

The gears 28 and 17 are thrown into and out of clutch relation by the following mechanism: A cylinder 31 is mounted on the end of the shaft 19. It is provided with a piston 32. A number of rods 33 extend from the piston to a flange 34. The flange 34 is formed on a sleeve 35 and the sleeve 35 forms an extension on the bushing 29. The sleeve 35 is mounted in a bearing 36 mounted on the side beam 2. Rods 38 extend through the bushing 29 and are secured by adjusting nuts 37. The rods extend through perforations 40 in the sleeve 25 and have the screw-threaded ends 41 which are screwed into the bushing 18. The shaft 19 is journaled in a bearing 42 mounted on the beam 11. The shaft 19 is also free to rotate with the sleeve 35 in the bearing 36 and also to slide relatively to the sleeve 35 as pressure is delivered on the piston 32. When the drum 24 is being driven through the locking of one of the clutches the shaft 19, the drum and gear in engagement with the drum rotate so that the thrust bearings on the shoulders receiving the thrust are not subjected to wear. When, however, the drum is rotating loosely as the cable is played out it rotates on the sleeve 25 and the shaft remains or may remain stationary although it is not locked against turning. It will readily be seen that as the piston is moved toward the left the gear 17 is drawn into clutch position and as the piston is moved toward the right the gear 17 is moved out of clutch position and the gear 28 thrown in. Thus either gear may be thrown into clutch position. Where the piston is stopped in neutral position the drum will be free from both gear connections.

A trip drum 43 is mounted on a shaft 44. This shaft is journaled in bearings 45 on the beams 1 and 11. A gear 46 is carried by the shaft 44 and driven from a gear 47 fixed on the shaft 9. The usual clutch mechanism is provided for locking and releasing the trip drum 43 with and from the gear 46. A gear 47$^a$ meshes with the gear 46 and is arranged to drive the second drum 48 through the usual clutch mechanism. The gear 47 and drum 48 are mounted on a shaft 48ª journaled in bearings 48ᵇ on the beams 1 and 11.

In the alternative construction a main drum 49 is formed with a central sleeve 50 which is mounted on the sleeve 25. The drum has the side flanges 51 secured on the sleeve 50 by means of the bolts 52. The low speed gear connection has a gear 55 fixed on a crank shaft 56, the crank shaft in this construction being journaled in bearings 57 on the beams 11 and 2. The gear 55 meshes with a gear 58 mounted on a shaft 59, the shaft 59 being carried in bearings 60 on the beams 1 and 11. A gear 61 is fixed on the inner end of the shaft 59 and meshes with an internal gear 62. The internal gear 62 is mounted on the bushing 18 in the same manner as the gear 17. A cone surface 63 is mounted on the gear 62 and operates on the friction surfaces 64 on the flange 51 of the main drum. A trip line drum 65 is mounted on the shaft 59 and has the usual clutch connection with the gear 58. A second drum 66 is mounted on a shaft 66ª and the shaft 66ª is driven from a gear 66ᵇ, the gear 66ᵇ meshing with the internal gear 62. The usual clutch connections are provided between the drum 66 and shaft 66ª.

The high speed gear connection to the main drum has the gear 67 mounted on the shaft 56 which meshes with a gear 68. The gear 68 is mounted on the bushing 29 in the same manner as the gear 28. It is provided with a cone 69 which meshes with the friction surfaces 70 on the side of the main drum. The gears 62 and 68 are thrown into and out of clutch relation in the same manner as in the construction shown in Fig. 1.

In order to introduce the steam to the opposite ends of the piston I provide the port 71 leading to the inner end of the cylinder and the port 72 leading to the outer end of the cylinder. The port 71 opens into an annular passage 73 and the port 72 to an annular passage 74. The annular passage 73 is connected by a port 75 with a passage 76 connecting with the steam line. The annular port 74 is connected through a port 77 with a passage 78 connected with the steam line. These are controlled by the ordinary valves and thus steam may be thrown into or out of either end of the cylinder. The details of this particular mechanism do not form the subject matter of this application.

What I claim as new is:—

1. In a logging engine, the combination of a frame; a drive shaft mounted on the frame; a rotatable drum shaft; mountings for the drum shaft mounted on the frame; a drum rotatably mounted on said drum shaft; two gear connections between the drive shaft and the drum, one connection having a gear ratio greater than the other and both driving the drum in the same direction, one gear of one connection being at one end of the drum and one gear of the other connection being at the opposite end of the drum; friction clutch connections between the gears and the drum; and means on the drum shaft acting from one end of the drum for throwing the clutches, said means having its thrust surfaces locked against relative rotation and acting through the drum to throw one of the clutches.

2. In a logging engine, the combination of a frame; a drive shaft mounted on the frame; a drum shaft; mountings for the drum shaft mounted on the frame; a drum rotatably mounted on said drum shaft; two gear connections between the drive shaft and the drum, one connection having a gear ratio greater than the other and both driving the drum in the same direction, one gear of one connection being at one end of the drum and one gear of the other connection being at the opposite end of the drum; friction clutch connections between the gears and the drum; and means on the drum shaft acting from without the mounting at one end of the shaft for throwing the clutches, said means having its thrust surfaces locked against relative rotation.

3. In a logging engine, the combination of a frame; a drive shaft mounted in the frame; a drum shaft; mountings on the frame for the drum shaft; a drum rotatably mounted on said drum shaft; two gear connections between the drive shaft and the drum, one gear of each connection being mounted on the drum shaft and at the opposite end of the shaft from the other of said gears and both gear connections driving the drum in the same direction and one connection having a different gear ratio than the other; friction clutches operating in connection with the gears on the drum shaft for setting and releasing each gear connection; and means mounted on the drum shaft and communicating movement through a mounting for throwing said clutches and through the drum for throwing one of the clutches, said means having its thrust surfaces locked against relative rotation.

4. In a logging engine, the combination of a frame; a drive shaft mounted in the frame; a drum shaft; mountings on the frame for the drum shaft; a drum rotatably mounted on said drum shaft and locked against longitudinal movement thereon; two gear connections between the drive shaft and the drum, one gear of each connection being mounted on the drum shaft and at the opposite end of the drum from the other of said gears and both gear connections driving the drum in the same direction and one connection having a different gear ratio than the other; friction clutches operating in connection with the gears on the drum shaft for setting and releasing each gear connection; and means mounted on the shaft without one of the mountings and operating through a mounting for throwing both of said clutches and through the drum for throwing one of the clutches, said means having its thrust sustained by the shaft.

5. In a logging engine, the combination of a frame; a drive shaft mounted on the frame; a drum shaft; mountings for the drum shaft mounted on the frame; a drum rotatably mounted on the drum shaft; gear connections between the drive shaft and the drum, each connection having a gear mounted on the drum shaft; clutch connections between said gears and the drum; bushings slidingly mounted on the drum shaft on which said gears are journaled; rods connecting said bushings, said rods extending through the drum; and means operating on said rods for setting the clutches.

6. In a logging engine, the combination of a frame; a drive shaft mounted on the frame; a drum shaft; mountings for the drum shaft mounted on the frame; a drum rotatably mounted on the drum shaft; gear connections between the drive shaft and the drum, each connection having a gear mounted on the drum shaft; clutch connections between said gears and the drum; bushings slidingly mounted on the drum shaft on which said gears are journaled; rods connecting said bushings, said rods extending through the drum; and means operating on said rods for setting the clutches comprising a device arranged without a mounting and communicating its movement through the mounting.

In testimony whereof I have hereunto set my hand.

HARRY L. TURNEY.